(12) United States Patent
McClay et al.

(10) Patent No.: US 12,053,141 B2
(45) Date of Patent: Aug. 6, 2024

(54) VACUUM CLEANING DEVICE WITH FOLDABLE WAND TO PROVIDE STORAGE CONFIGURATION

(71) Applicant: SHARKNINJA OPERATING LLC, Needham, MA (US)

(72) Inventors: Casey McClay, Medford, MA (US); Kevin Kelemen, Randolph, MA (US); Owen R. Johnson, Needham, MA (US); Steven Gacin, Pawtucket, RI (US); Patrick Cleary, Allston, MA (US); AiMing Xu, Suzhou (CN); Dawei Zhao, Suzhou (CN); Yaqin Wang, Suzhou (CN); Weiwei He, Suzhou (CN)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/843,709

(22) Filed: Jun. 17, 2022

(65) Prior Publication Data
US 2022/0400922 A1 Dec. 22, 2022

Related U.S. Application Data

(60) Provisional application No. 63/212,412, filed on Jun. 18, 2021.

(51) Int. Cl.
*A47L 9/24* (2006.01)
*F16L 27/10* (2006.01)

(52) U.S. Cl.
CPC .............. *A47L 9/248* (2013.01); *F16L 27/10* (2013.01)

(58) Field of Classification Search
CPC .......... A47L 9/242; A47L 9/244; A47L 9/248; A47L 9/24; A47L 5/36; Y10T 403/32327; Y10T 403/32336
(Continued)

(56) References Cited

U.S. PATENT DOCUMENTS 1,759,947 A 5/1930 Lee
2,074,042 A 3/1937 Bank
(Continued)

FOREIGN PATENT DOCUMENTS

CA 1258277 8/1989
CA 2399848 9/2003
(Continued)

OTHER PUBLICATIONS

CN-210169955-U translation Espacenet (Year: 2023).*
(Continued)

*Primary Examiner* — Brian D Keller
*Assistant Examiner* — Tim Brady
(74) *Attorney, Agent, or Firm* — Grossman Tucker Perreault & Pfleger, PLLC

(57) ABSTRACT

A wand includes a hinge configured to pivotally connect first and second wand segments in an extended configuration and a storage configuration. A first locking mechanism locks the wand in extended configuration. A second locking mechanism includes a rod, a sliding lever, a plunger, and a plunger cavity. The plunger is configured to be received in the plunger cavity to lock the wand in the storage configuration. When in the extended configuration, depressing a single actuator pivots the locking arm, causes the hook/pawl to be removed from the locking cavity, and unlocks the wand. When in the storage configuration, depressing the single actuator causes the rod to move in a first direction, causes the sliding rod to move a second direction, and urges the plunger out of the plunger cavity.

20 Claims, 12 Drawing Sheets

(58) Field of Classification Search
USPC .......... 403/83, 91, 92, 93, 95, 102, 103, 104
See application file for complete search history.

(56) References Cited

U.S. PATENT DOCUMENTS

| | | | |
|---|---|---|---|
| 3,163,707 | A | 12/1964 | Darling |
| 3,245,698 | A | 4/1966 | Fromknecht |
| 3,306,634 | A | 2/1967 | Groves et al. |
| 3,314,039 | A | 4/1967 | Opper |
| 3,451,495 | A | 6/1969 | Bayless et al. |
| 4,158,462 | A | 6/1979 | Coral |
| 4,393,536 | A | 7/1983 | Tapp |
| 4,644,605 | A | 2/1987 | Joss et al. |
| 4,928,792 | A | 5/1990 | Krause |
| 5,107,567 | A | 4/1992 | Ferrari et al. |
| 5,331,715 | A | 7/1994 | Johnson et al. |
| 5,927,758 | A | 7/1999 | Carlsson |
| 5,996,175 | A | 12/1999 | Fusco |
| 6,015,298 | A | 1/2000 | Linhart |
| 6,155,620 | A | 12/2000 | Armstrong |
| 6,345,408 | B1 | 2/2002 | Nagai et al. |
| 6,553,613 | B2 | 4/2003 | Onishi et al. |
| 6,695,352 | B2 | 2/2004 | Park et al. |
| 6,739,787 | B1 | 5/2004 | Bystrom |
| 6,779,229 | B2 | 8/2004 | Lee et al. |
| 6,904,640 | B2 | 6/2005 | Jin et al. |
| 7,194,784 | B2 | 3/2007 | Overvaag et al. |
| 7,226,302 | B2 | 6/2007 | Walter et al. |
| 7,281,298 | B2 | 10/2007 | Joung et al. |
| 7,383,609 | B2 | 6/2008 | Ji |
| 7,496,984 | B2 | 3/2009 | Pang |
| 7,507,269 | B2 | 3/2009 | Murphy et al. |
| 7,516,762 | B2 | 4/2009 | Colbachini |
| 7,681,279 | B2 | 3/2010 | Kelly |
| 8,020,251 | B2 | 9/2011 | Luebbering et al. |
| 8,296,901 | B2 | 10/2012 | Rosenzweig et al. |
| 8,813,297 | B2 | 8/2014 | Rosenzweig et al. |
| 8,918,952 | B2 | 12/2014 | Rowntree |
| 8,966,711 | B2 | 3/2015 | Millington et al. |
| 8,984,701 | B2 | 3/2015 | Tussy |
| 9,125,538 | B2 | 9/2015 | Paliobeis |
| 9,215,960 | B2 | 12/2015 | Conrad |
| 9,480,378 | B2 | 11/2016 | Paliobeis |
| D810,369 | S | 2/2018 | Woo et al. |
| D836,865 | S * | 12/2018 | Niedzwecki .................. D32/31 |
| D892,420 | S * | 8/2020 | Niedzwecki .................. D32/31 |
| 10,966,581 | B2* | 4/2021 | Innes ...................... A47L 9/248 |
| 2002/0101075 | A1 | 8/2002 | Park et al. |
| 2004/0134022 | A1 | 7/2004 | Murphy et al. |
| 2004/0211029 | A1 | 10/2004 | Ueda |
| 2004/0261212 | A1 | 12/2004 | Park et al. |
| 2004/0261213 | A1 | 12/2004 | Park et al. |
| 2005/0022338 | A1 | 2/2005 | Muhlenkamp |
| 2005/0081326 | A1 | 4/2005 | Jeon |
| 2005/0115018 | A1 | 6/2005 | Jeon |
| 2005/0125945 | A1 | 6/2005 | Park |
| 2006/0137128 | A1 | 6/2006 | Elsworthy et al. |
| 2006/0156510 | A1 | 7/2006 | Park et al. |
| 2008/0174105 | A1 | 7/2008 | Hyatt |
| 2008/0295282 | A1 | 12/2008 | Olsson et al. |
| 2009/0019663 | A1 | 1/2009 | Rowntree |
| 2009/0188997 | A1* | 7/2009 | Rosenzweig ........... A47L 9/242 239/722 |
| 2010/0117357 | A1 | 5/2010 | Hyatt |
| 2010/0229315 | A1* | 9/2010 | Rosenzweig ........... B25G 3/38 15/144.1 |
| 2012/0216361 | A1 | 8/2012 | Millington et al. |
| 2014/0237755 | A1 | 8/2014 | Conrad |
| 2015/0096143 | A1 | 4/2015 | Conrad |
| 2017/0079495 | A1 | 3/2017 | Blanchard et al. |
| 2017/0112343 | A1* | 4/2017 | Innes ...................... A47L 5/28 |
| 2017/0290484 | A1 | 10/2017 | Emmett et al. |
| 2019/0059672 | A1 | 2/2019 | Zhang |
| 2019/0357740 | A1* | 11/2019 | Thorne .................. A47L 9/102 |

FOREIGN PATENT DOCUMENTS

| | | |
|---|---|---|
| CN | 1958259 | 5/2007 |
| CN | 108542308 | 9/2018 |
| CN | 210169955 U * | 3/2020 |
| CN | 210300851 U * | 4/2020 |
| DE | 19843973 | 7/1999 |
| DE | 102007036524 | 2/2009 |
| DE | 102012112532 | 6/2014 |
| EP | 1310202 | 5/2003 |
| EP | 1543757 | 6/2005 |
| EP | 1764021 | 3/2007 |
| EP | 2082675 | 6/2010 |
| EP | 1981387 | 10/2011 |
| EP | 2680734 | 11/2016 |
| EP | 3566628 | 7/2022 |
| GB | 2386054 | 9/2003 |
| GB | 2488368 | 8/2012 |
| GB | 2499120 | 8/2013 |
| JP | 3424151 | 8/1998 |
| JP | 2000300484 | 10/2000 |
| JP | 2005161009 | 6/2005 |
| JP | 2010082166 | 4/2010 |
| JP | 2012179356 | 9/2012 |
| JP | 2013070839 | 4/2013 |
| JP | 2013192867 | 9/2013 |
| JP | 2013192869 | 9/2013 |
| JP | 2013192880 | 9/2013 |
| JP | 2013198701 | 10/2013 |
| JP | 2014045870 | 3/2014 |
| JP | 5602168 | 10/2014 |
| JP | 2016036426 | 3/2016 |
| JP | 2016112076 | 6/2016 |
| JP | 2017000539 | 1/2017 |
| JP | 2018535703 | 12/2018 |
| KR | 19950000270 | 1/1995 |
| KR | 19990074966 | 10/1999 |
| KR | 100730948 | 6/2007 |
| SE | 104383 | 4/1942 |
| SE | 9600650 | 8/1997 |
| WO | 0065978 | 11/2000 |
| WO | 0197673 | 12/2001 |
| WO | 2005034706 | 4/2005 |
| WO | 2007086798 | 8/2007 |
| WO | 2008009583 | 1/2008 |
| WO | 2012117231 | 9/2012 |

OTHER PUBLICATIONS

CN-210300851-U translation Espacenet (Year: 2023).*
PCT Search Report and Written Opinion mailed Jan. 8, 2018, received in related Application No. PCT/US17/57227, 9 pgs.
Japanese Office Action with English translation issued Dec. 14, 2018, received in corresponding Japanese Application No. 2017-557209, 6 pgs.
English Translation of Korean Office Action issued Jul. 21, 2019, received in corresponding Korean Application No. 10-2019-7014642, 7 pgs.
Australian Examination Report issued May 17, 2019, received in corresponding Australian Application No. 2017352431, 3 pgs.
Canadian Office Action issued Jul. 17, 2019, received in corresponding Application No. 3,041,265, 6 pgs.
EP Search Report issued Sep. 25, 2019, received in EP Application No. 19173961.4, 7 pgs.
Chinese Office Action with English language summary, issued Oct. 21, 2019, received in Chinese Application No. 201711007647.7, 13 pgs.
Korean Office Action with English translation dated Jan. 22, 2020, received in KR Appliction No. 10-2019-7014642, 12 pgs.
European Extended Search Report dated Dec. 19, 2019, received in EP Application No. 17864455.5, 10 pgs.
Chinese Office Action with English translation issued Aug. 12, 2020, received in China Patent Application No. 201711007647.7, 13 pgs.
Japanese Office Action with English translation issued Aug. 24, 2020, received in Japanese Patent Application No. 2019-139822, 6 pgs.

(56) References Cited

OTHER PUBLICATIONS

Chinese Office Action with English translation issued Dec. 28, 2020, received in China Patent Application No. 201910917837.5, 11 pgs.
EP Examination Report issued Oct. 6, 2020, received in EP Application No. 17864455.5, 4 pgs.
EP Examination Report issued May 6, 2021, received in EP Application No. 17864455.5, 5 pgs.
Australian Examination Report issued Feb. 15, 2022, received in Australian Patent Application No. 2020280983, 5 pages.
Japanese Office Action with English translation mailed May 13, 2022, received in Japanese Patent Application No. 2021-083483, 5 pages.
Japanese Office Action with English translation issued Aug. 30, 2022, received in Japanese Patent Application No. JP2021-083483, 4 pages.
U.S. Office Action mailed Dec. 7, 2018, received in U.S. Appl. No. 15/333,109, 6 pages.
U.S. Office Action mailed Apr. 25, 2019, received in U.S. Appl. No. 15/333,109, 10 pages.
U.S. Office Action mailed Feb. 3, 2020, received in U.S. Appl. No. 15/333,109, 16 pages.
Australian Examination Report issued Nov. 8, 2022, received in Australian Patent Application No. 2020280983, 6 pages.
PCT Search Report and Written Opinion, mailed Sep. 13, 2022, received in corresponding PCT Application No. PCT/US2022/034078, 10 pages.
Communication of a Notice of Opposition against European Patent EP3566628B1 dated Apr. 17, 2023, 41 pages.
Consolidated List of References Cited in Notice of Opposition against EP3566628B1, 1 page.
D5 from Notice of Opposition—Specification of EP3566628B1 as originally filed, 28 pages.
D6 from Notice of Opposition—Specification of WO2018/080873 as originally filed, 27 pages.
D7 from Notice of Opposition—Track changes copy of the text of EP3566628B1 as granted vs as originally filed, 17 pages.
D8 from Notice of Opposition—Track changes copy of the text of EP3566628B1 as granted vs WO2018/080873 as originally filed, 19 pages.
U.S. Office Action issued Mar. 30, 2023, received in U.S. Appl. No. 17/222,075, 14 pages.
Australian Examination Report issued Jan. 10, 2024, received in Australian Patent Application No. 2022294097, 3 pages.
Canadian Office Action issued Jan. 9, 2024, received in Canadian Patent Application No. 3,223,222, 5 pages.
Japanese Notice of Reasons for Refusal with machine-generated English translation issued May 14, 2024, received in Japanese Patent Application No. 2023-578018, 10 pages.
Korean Office Action with machine-generated English translation issued May 26, 2024, received in Korean Patent Application No. 10-2024-7000476, 7 pages.
Australian Office Action issued May 13, 2024 received in Australian Patent Application No. 2023200845, 3 pages.

* cited by examiner

VACUUM CLEANING DEVICE WITH FOLDABLE WAND TO PROVIDE STORAGE CONFIGURATION

CROSS-REFERENCE TO RELATED APPLICATIONS

This application claims the benefit of U.S. Provisional Application Ser. No. 63/212,412, filed Jun. 18, 2021, which is fully incorporated herein by reference.

TECHNICAL FIELD

The present disclosure relates to vacuum cleaning devices and more particularly, to a vacuum cleaning device with a foldable wand to provide a storage configuration.

BACKGROUND INFORMATION

Vacuum cleaners devices are used in the home, office and other locations to treat floors and other surfaces. Some vacuum cleaners include a straight, rigid wand between a handle and a surface cleaning head that contacts a surface being cleaned. Some vacuum cleaners may also include a vacuum unit at an opposite end of the wand from the surface cleaning head. The rigidity of the wand often makes it more difficult to use the vacuum cleaner and to store the vacuum cleaner, particularly when a vacuum unit is attached to at an opposite end of the wand.

BRIEF DESCRIPTION OF THE DRAWINGS

Embodiments are illustrated by way of example in the accompanying figures, in which like reference numbers indicate similar parts, and in which.

DETAILED DESCRIPTION

Vacuum cleaning devices, consistent with embodiments of the present disclosure, include foldable wands to provide a storage configuration and/or facilitate use. A vacuum cleaning device includes a wand having a first end coupled to a vacuum unit and a second end coupled to a vacuum head or surface cleaning head. The wand defines an air passage allowing air to pass from the surface cleaning head to the vacuum unit and includes a flexible air passage along at least a portion of the wand. The wand also includes a plurality of segments pivotably connected together such that the wand is foldable about 180° in a forward direction until the vacuum unit is positioned proximate a top of the surface cleaning head, thereby providing a storage configuration.

Figure 1:
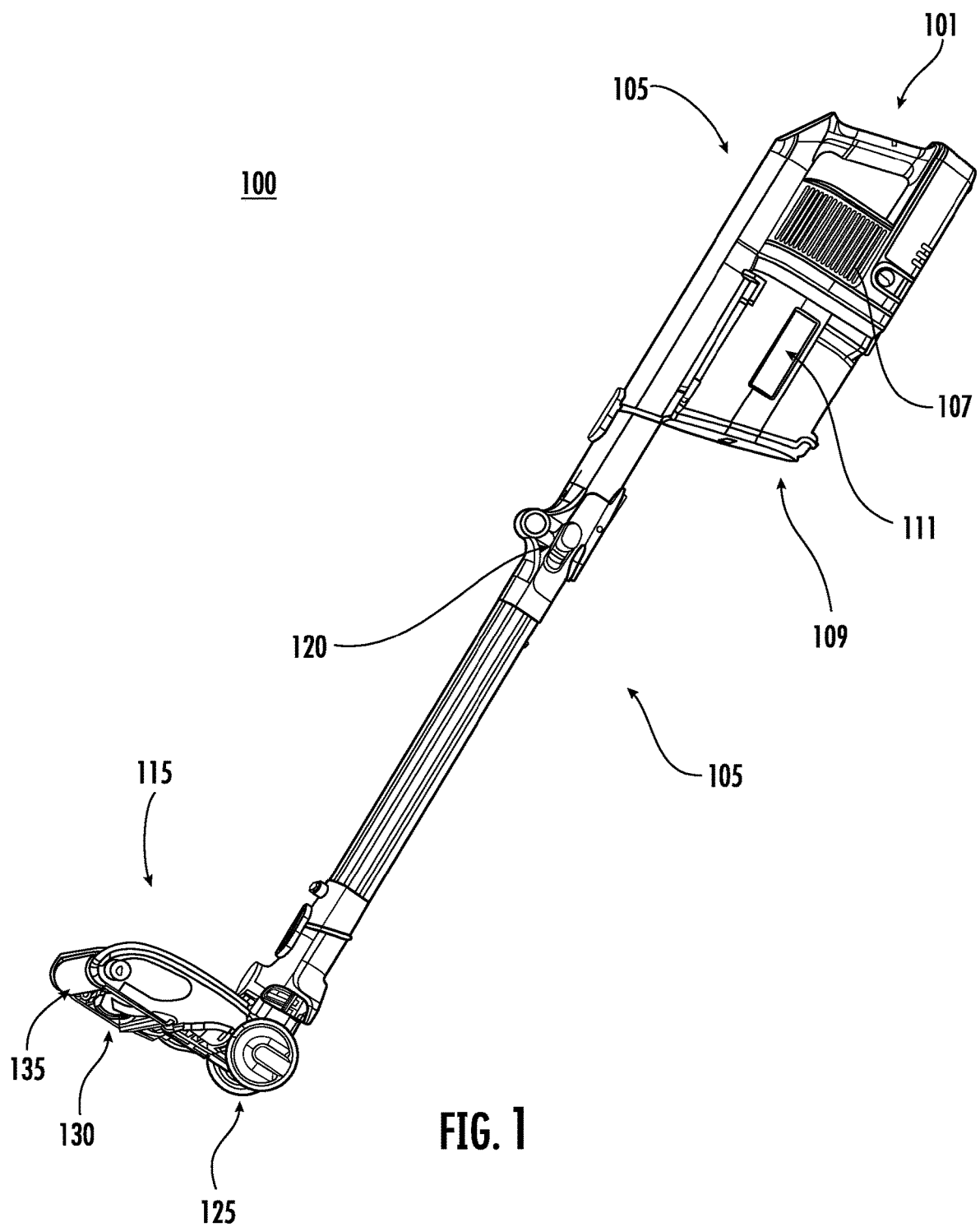
FIG. 1 generally illustrates an illustrative embodiment of a vacuum cleaning device.

FIG. 1 depicts an illustrative embodiment of a vacuum cleaning device 100 that may be used for cleaning or otherwise treating a floor surface, such as a carpet and/or hard floor. It should be appreciated that the vacuum cleaning devices described herein may be used as treatment devices or appliances that treat or operate on a surface to perform one or more functions.

As illustrated in FIG. 1, one embodiment of the vacuum cleaning device 100 includes a handle 101, a vacuum unit 105, a wand 110, a vacuum head or surface cleaning head 115, and a flexible air passage 120. The vacuum unit 105 may comprise any number of devices suitable for generating suction to pick up dirt, dust, debris and waste. In an embodiment, the vacuum unit 105 may include a motor 107 (shown schematically) for generating suction through a dust cup 109 and a filter 111 (shown schematically) disposed between the dust cup 109 and motor 107 for causing dust materials to be deposited in the dust cup 109. The vacuum unit 105 may be removably detachable from the wand 110 of the vacuum cleaning device 100. In such an embodiment, the vacuum unit 105 may be configured for use as a handheld vacuum when detached.

In some embodiments, the motor 107 may be electrically powered by connection to an electrical outlet, and in other embodiments, the motor 107 may be powered by a battery. The vacuum unit 105 may be integrally or removably attached to the handle 101. In an embodiment, the motor 107 and/or filter 111 may comprise any number of cyclone chambers (not shown), such as one, two, three, etc. In an embodiment, the vacuum unit 105 may include any number of dust cups 109, such as one, two, three, etc. Consistent with an embodiment to be discussed below, for example, the vacuum unit 105 may comprise two dust cups and two cyclones. It should be appreciated that the filter 111 may include any filter design known to those skilled in the art.

The vacuum head 115 provides the interface between the vacuum cleaning device 100 and the area targeted for vacuuming. Different embodiments of the vacuum cleaning device 100 may comprise different types of vacuum cleaning heads 115. In the embodiment shown in FIG. 1, the vacuum head 115 includes a roller system 125 rotatably coupled to a housing having a suction conduit opening or mouth 130. The rollers (e.g., wheels) 125 facilitate movement of the vacuum cleaning device 100. A variety of different types of roller systems 125 may be used in different embodiments. Other embodiments may employ different means to facilitate movement of the vacuum cleaning device 100.

The mouth 130 provides an opening where dust, dirt or other waste may be sucked into a suction conduit of the vacuum cleaning device 100. Different embodiments may employ different types of designs for the structure of the mouth 130. The mouth 130 may be defined in an assortment of shapes and sizes and may be divided into more than one opening. One or more agitators 135 may be at least partially provided in the mouth 130. In the illustrated example, the vacuum head 115 includes two agitators 135. One or more of the agitators 135 may be powered (e.g., rotated about a pivot axis) by an agitator rotation system.

The wand 110 fluidly connects the vacuum cleaning head 115 to the vacuum unit 105. The suction created by the vacuum unit 105 can thereby be delivered to the vacuum cleaning head 115 by way of the wand 110. Dirt, debris, and other waste can be picked up at the vacuum cleaning head 115 and sucked through the wand 110. As described herein, the wand 110 includes two or more wand segments coupled together at one or more joints that allows the user to bend the wand 110 to two or more different configurations.

Figure 2:
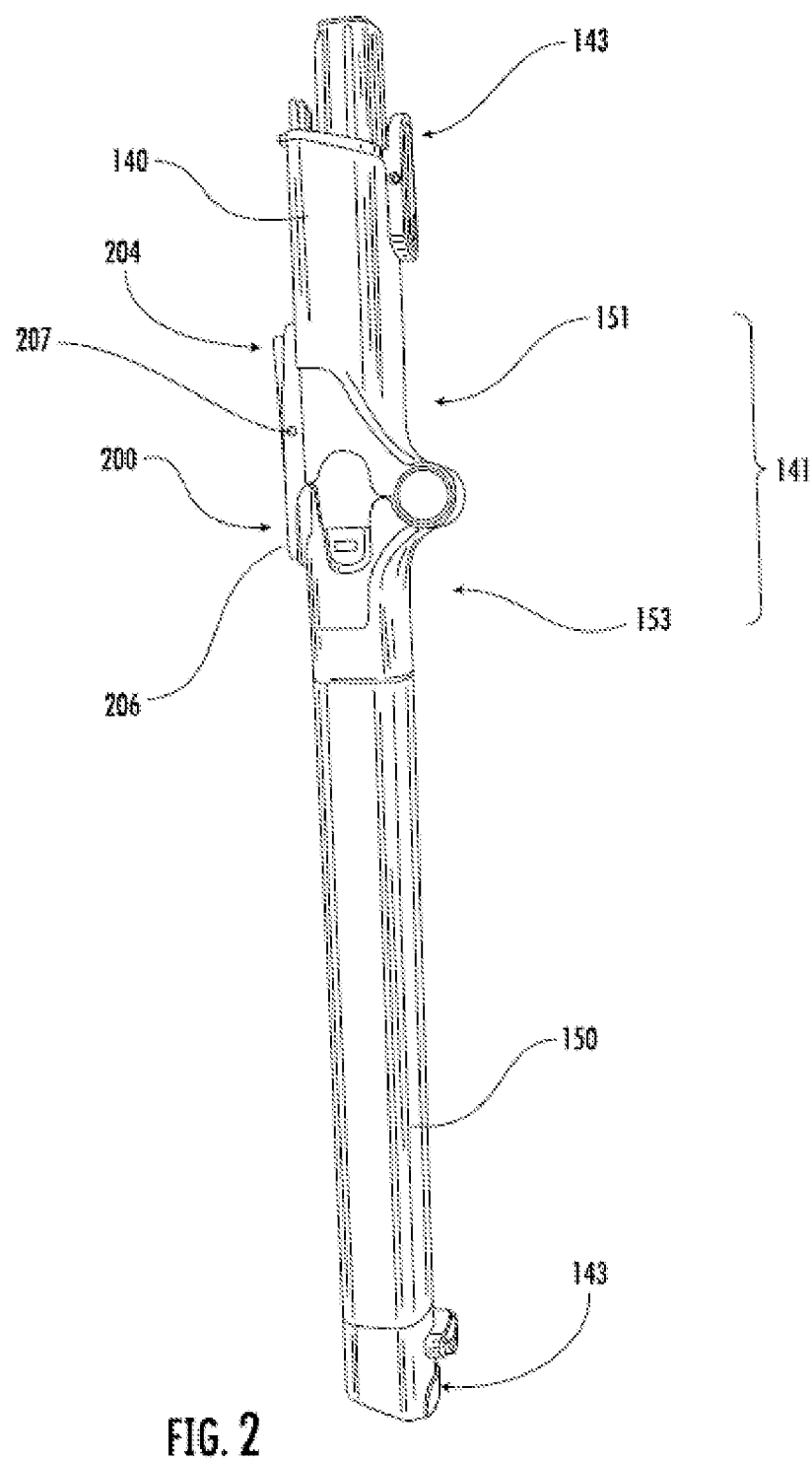
FIG. 2 generally illustrates an illustrative embodiment of a wand in an extended configuration.
Figure 3:
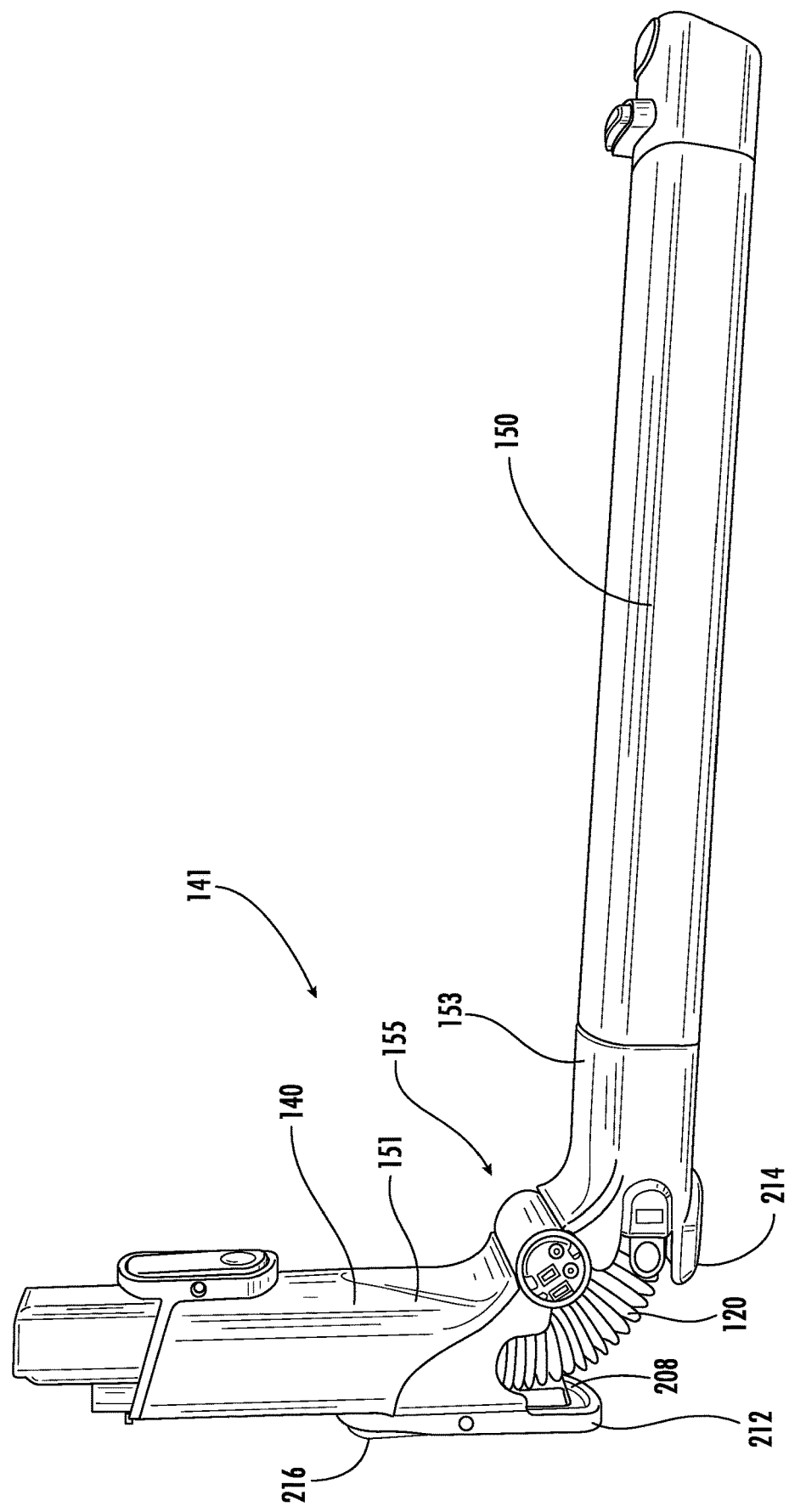
FIG. 3 generally illustrates an illustrative embodiment of a wand in a backsaver or intermediate configuration.
Figure 4:
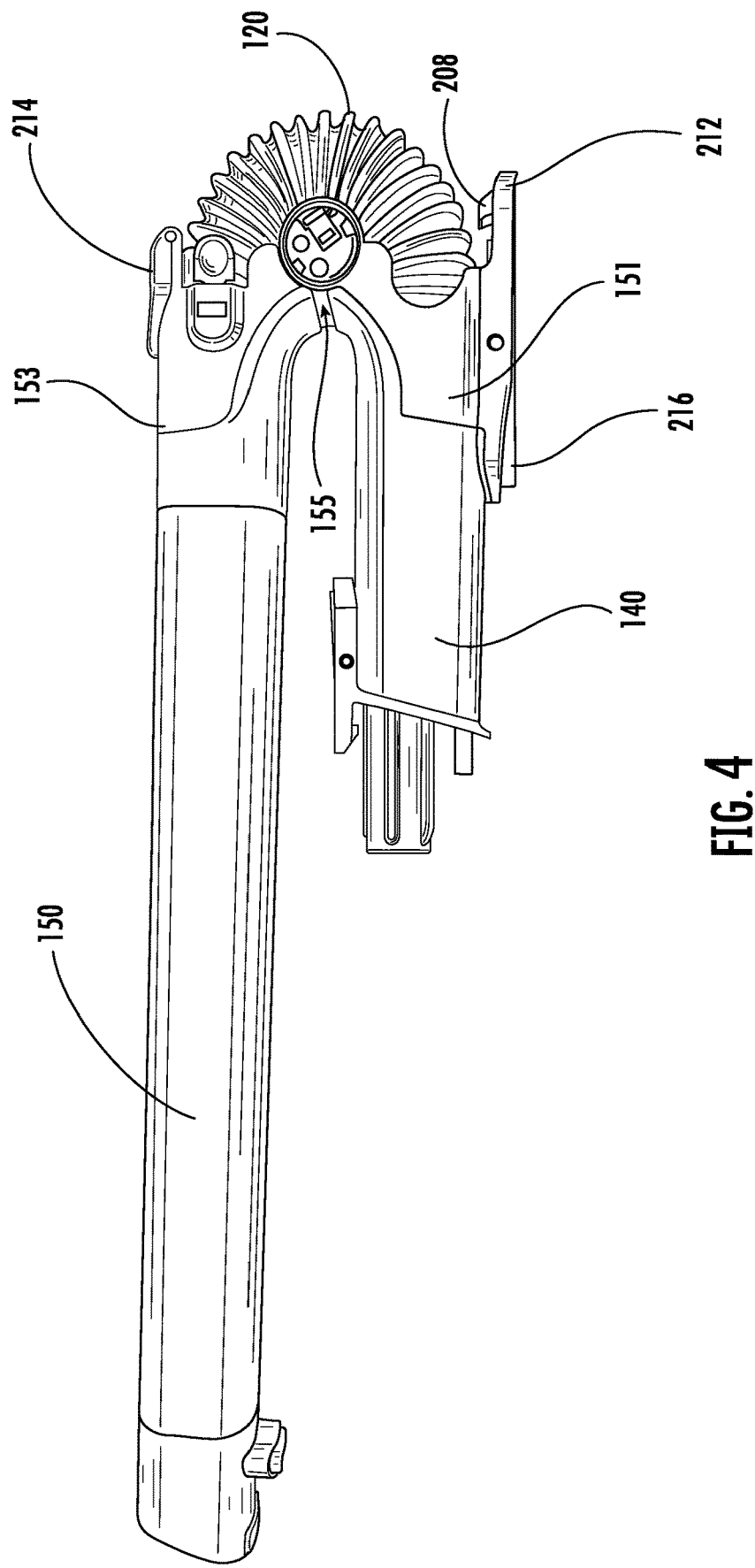
FIG. 4 generally illustrates an illustrative embodiment of a wand in a storage configuration.

Turning now to FIGS. 2-4, one example of a wand 110 consistent with the present disclosure is generally illustrated in different states/positions/configurations. In particular, FIG. 2 illustrates the wand 110 in an extended or straight configuration, FIG. 3 illustrates the wand 110 in a bent or backsaver configuration, and FIG. 4 illustrates the wand 110 in a storage configuration.

The wand 110 may include a plurality of wand segments 140, 150 pivotably connected to each other. The first and second wand segments 140, 150 may be configured to be fluidly coupled to the vacuum unit 105 and the vacuum head 115, respectively. In at least one example, the first and second wand segments 140, 150 may be removably coupled to the vacuum unit 105 and vacuum head 115 may way of one or more release mechanisms 143. The release mechanisms 143 may both fluidly couple and/or mechanically couple the first and second wand segments 140, 150 to the vacuum unit 105 and vacuum head 115, respectively, and may include any release mechanism known to those skilled in the art (e.g., but not limited to, a hook and cavity configuration or the like).

The wand 110 may include joint 141 comprising a first hinge member 151 at an end of a first wand segment 140 and a second hinge member 153 at the end of a second wand segment 150. The hinge members 151, 153 are pivotably coupled at hinge 155. It should be appreciated that one or more of the hinge members 151, 153 may be separate, discrete components/elements from the first and second wand segments 140, 150 and/or may be integral, one-piece components/elements with the first and second wand segments 140, 150 (e.g., formed from the same components/elements as the first and second wand segments 140, 150). The joint 141 may be configured to allow a user to pivot the first and second wand segments 140, 150 between the extended position (e.g., as shown in FIG. 2), the backsaver configuration (e.g., as shown in FIG. 3), and the storage configuration (e.g., as shown in FIG. 4).

A flexible hose 120 extends between the hinge members 151, 153 and wand segments 140, 150. When the hinge members 151, 153 pivot about the hinge 155, the flexible hose 120 flexes about the joint 141 as shown in FIGS. 3 and 4. The hinge 155 may therefore be disposed between the first segment 140 and the second segment 145, and may be configured to give the first segment 140 a range of motion around an axis of rotation centered at the hinge 155. The hinge 155 allows a user the ability to reshape the vacuum cleaning device 100 for storage or other purposes. In some embodiments, the hinge 155 may be configured to limit the range of motion of the first segment 140 to a predetermined angle of displacement (not shown), such as 90 degrees or 180 degrees.

Some embodiments of the vacuum cleaning device 100 may have more than two segments 140, 150, such as three, four, five, six, etc. Different embodiments may also include different number of hinges or joints to allow the segments a range of motion.

Figure 7:
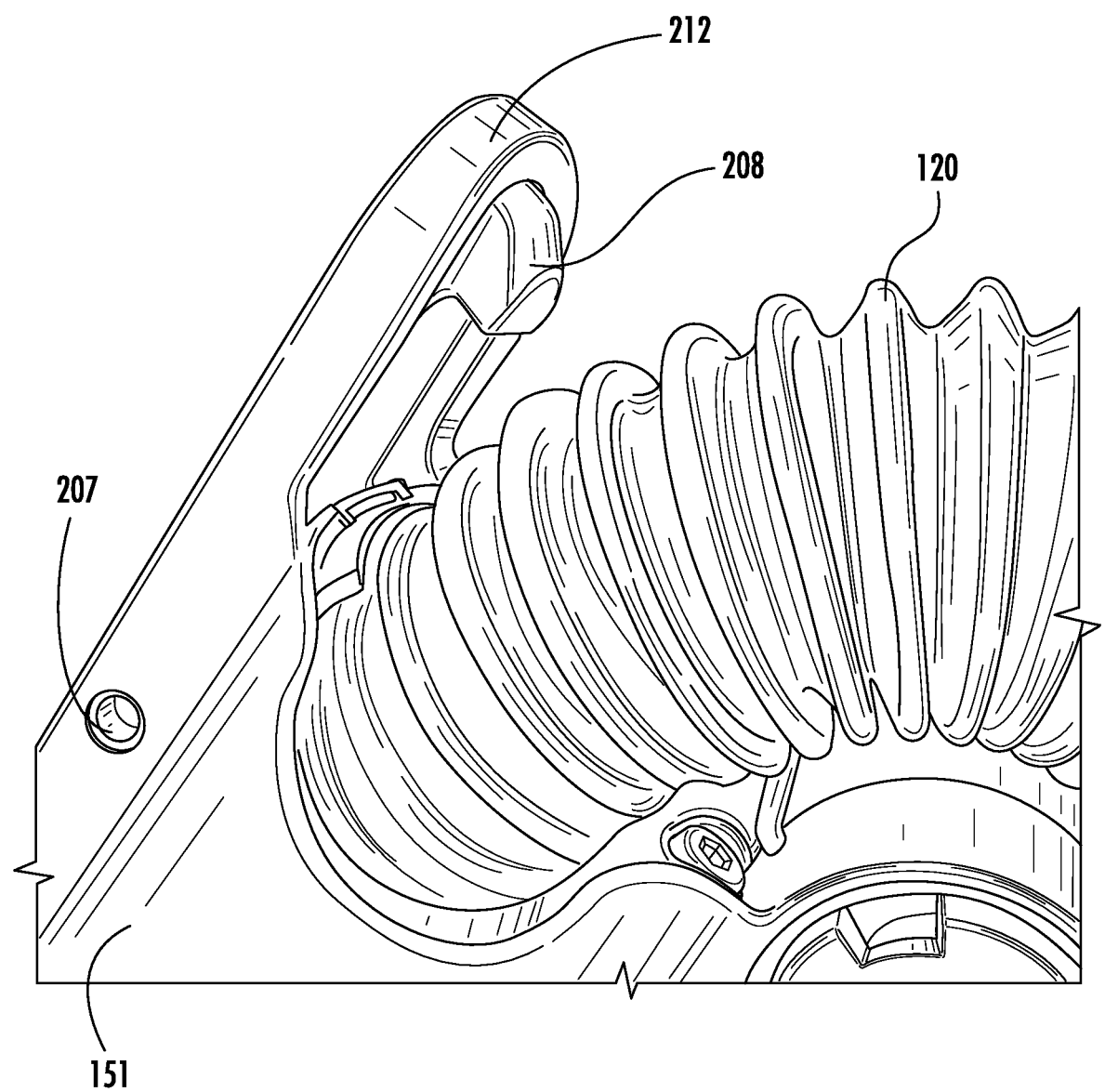
FIG. 7 generally illustrates a further view of the first locking mechanism in a backsaver or intermediate configuration.
Figure 8:
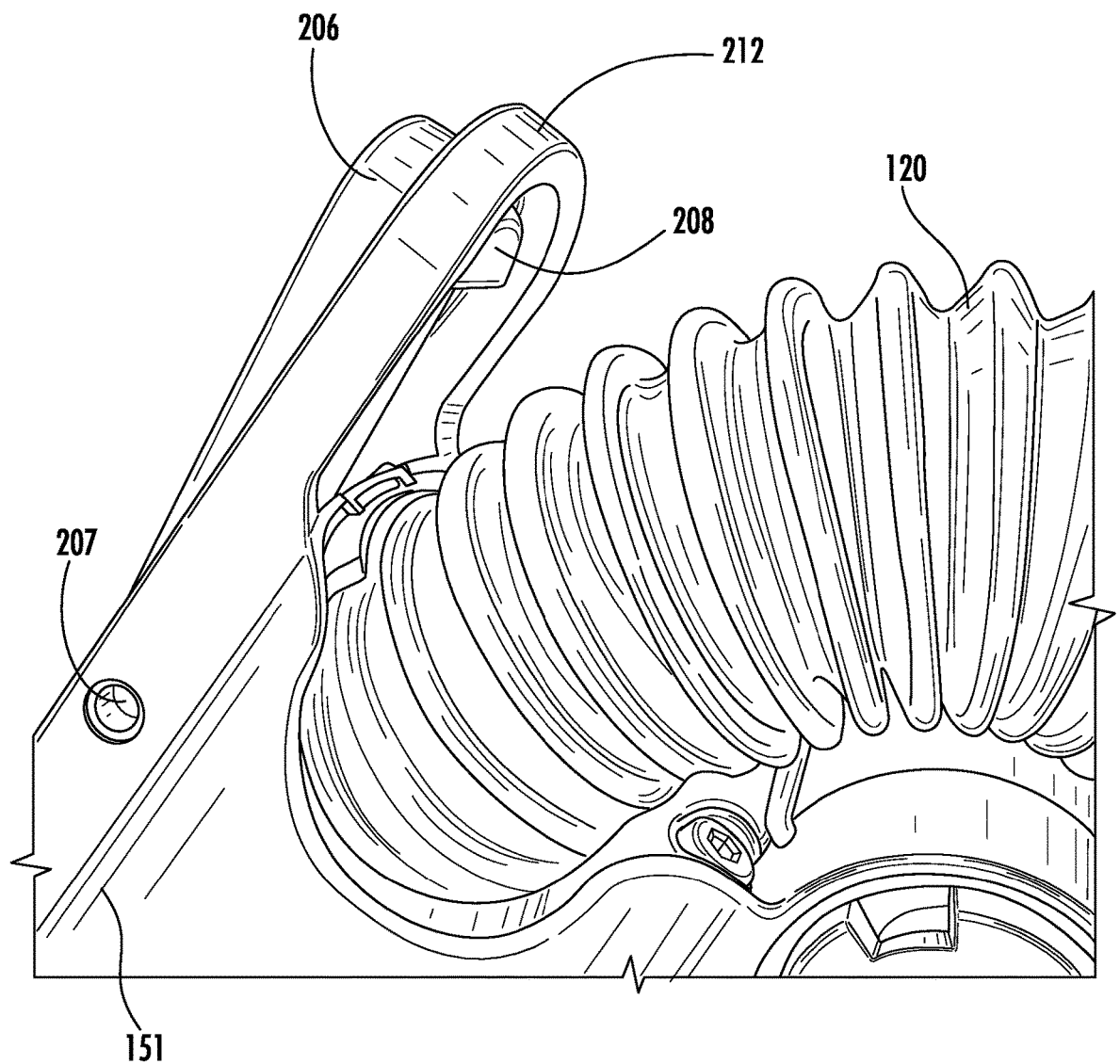
FIG. 8 generally illustrates yet another view of the first locking mechanism in a backsaver or intermediate configuration.
Figure 9:
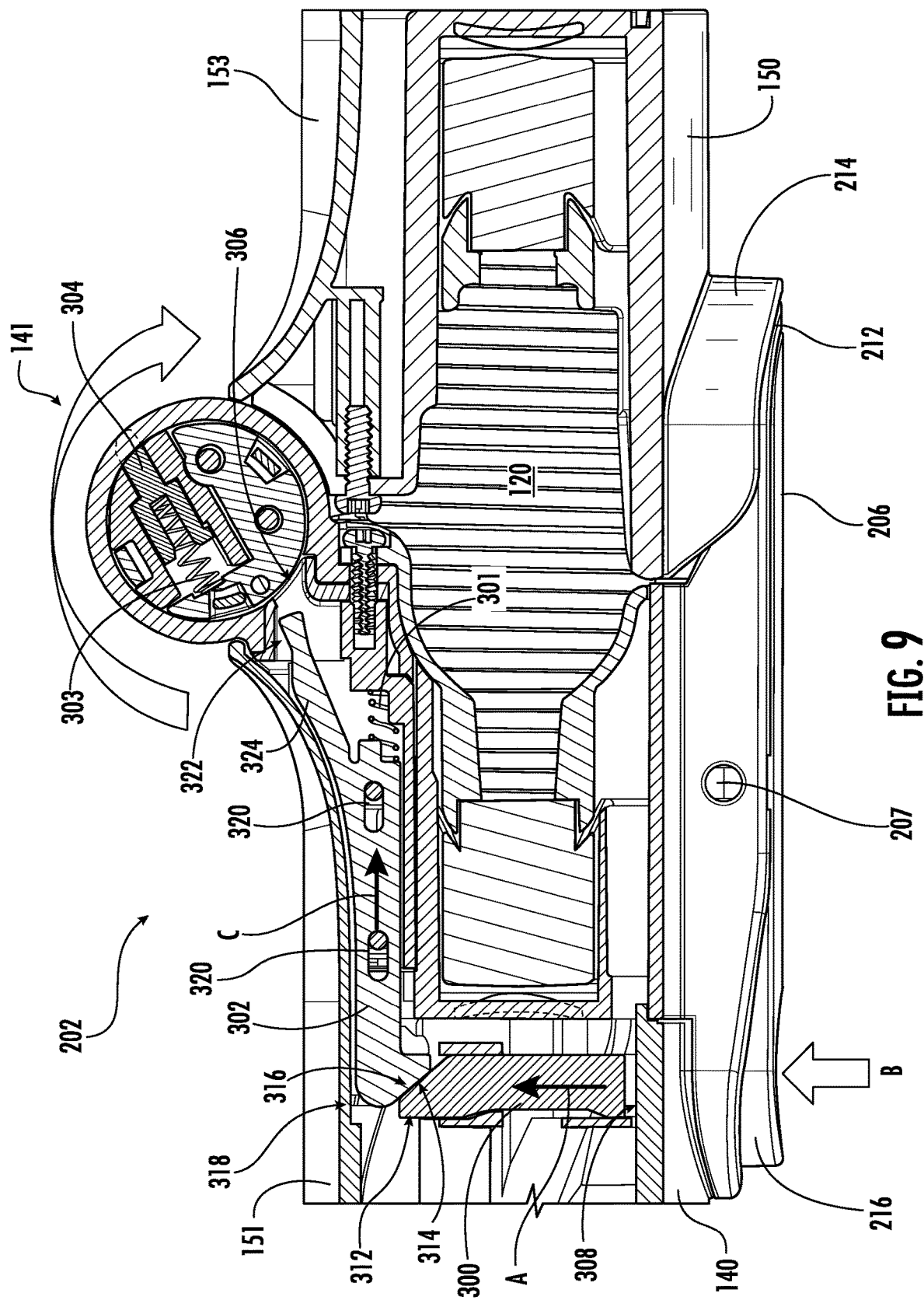
FIG. 9 generally illustrates an illustrated embodiment of the second locking mechanism in the extended configuration.
Figure 10:
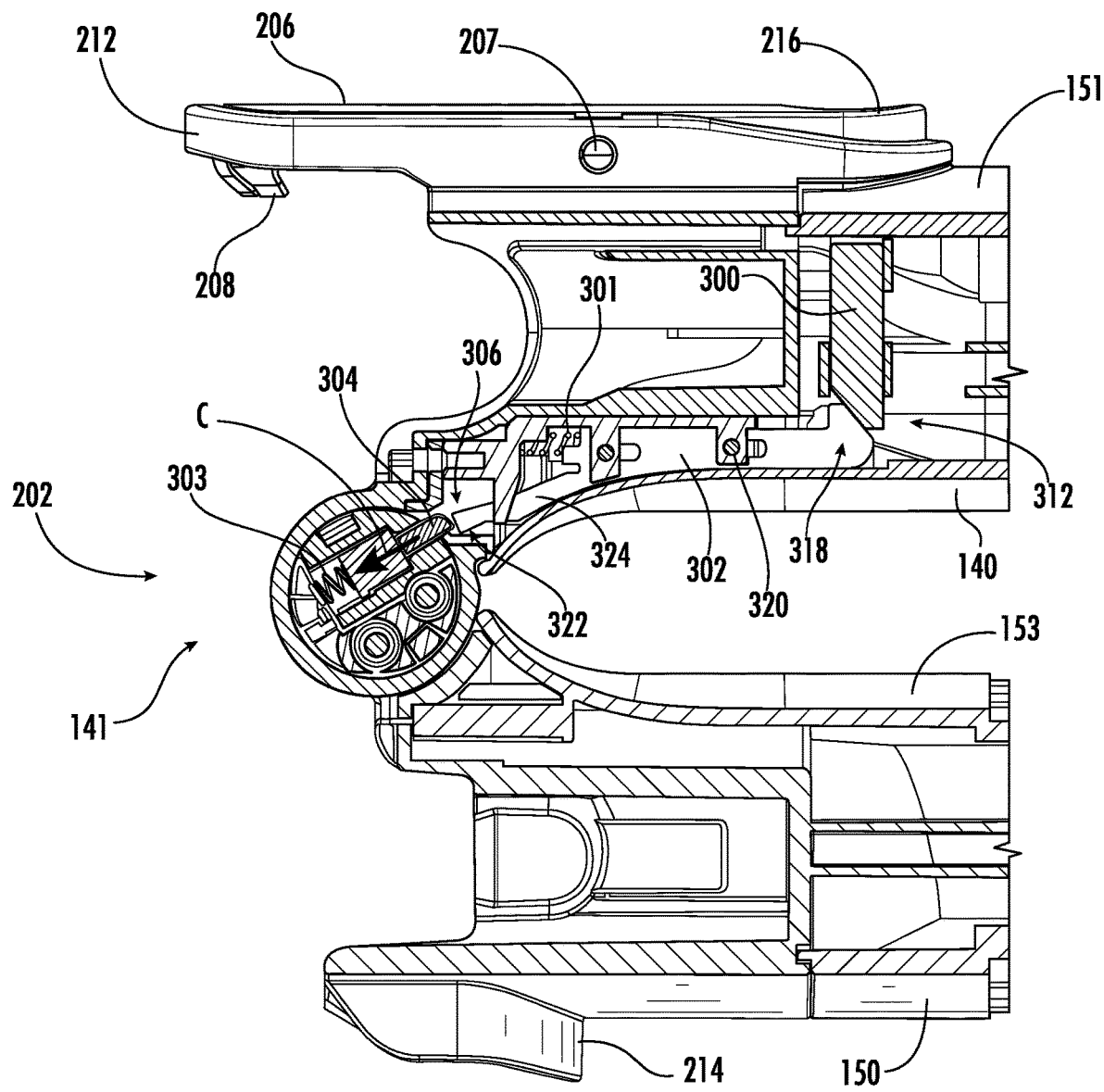
FIG. 10 generally illustrates the second locking mechanism in the storage configuration.

With reference to FIGS. 2-10, the wand 110 also includes a first and a second locking mechanism 200, 202 and a single actuator 204 (the second locking mechanism 202 is best shown in FIGS. 9-10). The first locking mechanism 200 is configured to lock (e.g., fix) the first and second wand segments 140, 150 in the extended position (e.g., FIG. 2), while the second locking mechanism 202 (best shown in FIGS. 9-10) is configured to lock (e.g., fix) the first and second wand segments 140, 150 in a storage configuration (e.g., FIG. 4). Optionally, the second locking mechanism 202 may be configured to lock (e.g., fix) the first and second wand segments 140, 150 in an intermediate configuration. As used herein, an intermediate configuration is intended to refer to a configuration in which the first and second wand segments 140, 150 have pivoted about the joint 141 to a joint angle between the extend configuration (i.e., a joint angle of 0) and the storage configuration (e.g., a joint angle of about 180).

One example of the first locking mechanism 200 is shown in FIGS. 2-8. In particular, the locking mechanism 200 may include a locking arm, latch, or the like 206 (best seen in FIGS. 5-8) which may be pivotally coupled to the first hinge member 151 about a pivot point 207 (though it should be appreciated that locking arm 206 may be pivotally coupled to the second hinge member 153). The locking arm 206 may include a locking pawl, hook, or the like 208 (best seen in FIGS. 7-8) that latches with a portion of a corresponding locking cavity 210 (best seen in FIG. 6) formed in the second hinge member 153 to secure the first and second hinge members 151, 153 in the desired position (e.g., in the extended configuration as shown in FIG. 2). It should be appreciated that the locking arm 206 may be pivotally coupled to the second hinge member 153 and the locking cavity 210 may be formed in the first hinge member 151.

Optionally, the locking arm 206 may include a biasing device (such as, but not limited to a spring or the like, not shown for clarity) that urges the locking arm 206 to a default locking position. The default locking position may correspond to a position in which the locking arm 206 is secured in the locking cavity 210 when in the extended configuration.

Figure 5:
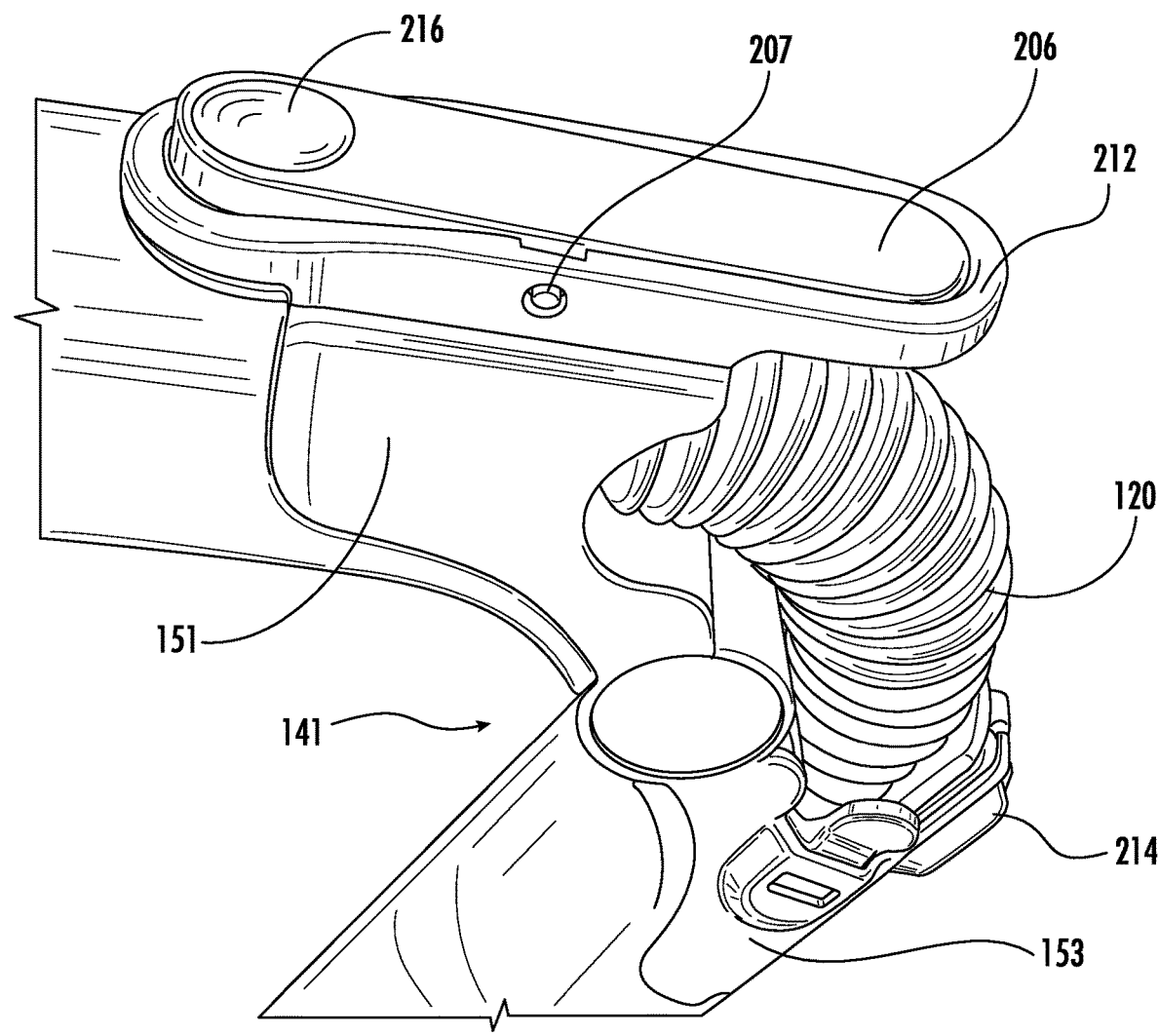
FIG. 5 generally illustrates an illustrative embodiment of the first locking mechanism in a backsaver or intermediate configuration.
Figure 6:
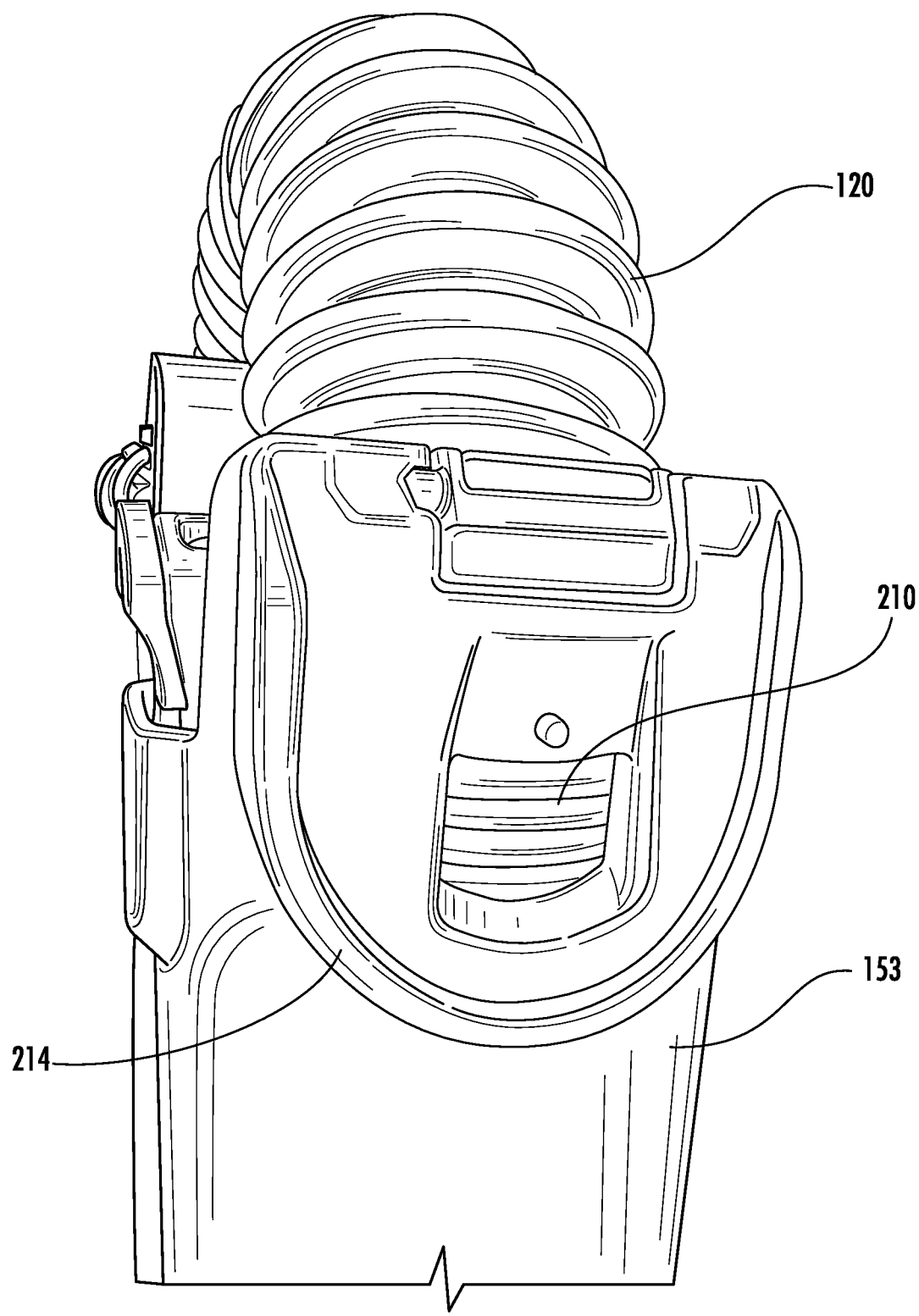
FIG. 6 generally illustrates another view of the first locking mechanism in a backsaver or intermediate configuration.

Optionally, a locking arm guard 212 (e.g., as generally illustrated in FIGS. 5, 7-8) may extend around a distal end of the locking arm 206 and a locking arm sidewall 214 (e.g., as generally illustrated in FIG. 6) may extend around at least a portion of the locking cavity 210. The locking arm guard 212 may be configured to be at least partially received in the locking arm sidewall 214 when in the extended configuration. The locking arm guard 212 and the locking arm sidewall 214 may increase the torsional rigidity of the wand 110 when in the extended configuration.

The single actuator 204 may include a button or tab 216 (see, e.g., FIG. 5). The single actuator 204 may be disposed on an opposite side of the wand 110 compared to the joint 141. In at least one example, the button 216 extends from the locking arm 206, e.g., on the opposite side of the pivot point 207. To move the hinge members 151, 153 (and by extension, the first and second wand segments 140, 150) from the extended configuration to an alternative configuration, the user may press (e.g., urge) the button 216 inwardly against the biasing device which causes the locking arm 206 to pivot about the pivot point 207 and release from the locking cavity 210, thereby allowing the user to move hinge members 151, 153 and the first and second wand segments 140, 150 from the extended configuration to another configuration.

Turning now to FIGS. 9-10, one example of the second locking mechanism 202 is generally illustrated. The second locking mechanism 202 may be triggered by the same single actuator 204 as the first locking mechanism 200. In particular, the second locking mechanism 202 may include a rod 300, a sliding lever 302, a plunger 304, and one or more plunger cavities 306. When in the unlocked state (e.g., as shown in FIG. 9), the plunger 304 is not disposed in the plunger cavity 306. For example, the plunger 304 may be disposed in the hinge 151 of the wand 110 (e.g., a cavity formed by the first and/or second hinge members 151, 153) when in the unlocked state. In contrast, when in a locked position (e.g., as shown in FIG. 10), the plunger 304 is at least partially received in the plunger cavity 306, thereby locking (i.e., fixing) the position of the first hinge member 151 relative to the second hinge member 153 (and by extension, the first and second wand segments 140, 150).

To release the second locking member 202 from the locked state, the user may press (e.g., urge) the button 216 inwardly against the biasing device which causes the rod 300 to move in the direction of arrow A (e.g., generally linearly towards the opposite side of the wand 110 compared to the joint 141). The rod 300 may have a generally arcuate shape such that allows it to generally extend around the fluid passageway of the wand 110. Movement of the rod 300 may be restricted by the first and second hinge members 151, 153. A first end region 308 of the rod 300 may engage the single actuator 204. For example, the first end region 308 of the rod 300 may contact the backside 310 of the button 216. Thus, movement of the button 216 (e.g., in the direction of arrow B) by the user may cause the rod 300 to move in the direction of arrow A. The second end region 312 of the rod 300 (e.g., generally opposite to the first end region 308) may include a camming surface 314 configured to engage (e.g., contact) a corresponding camming surface 316 on a first end region 318 of the sliding lever 302. The camming surface 314, 316 may be configured to translate the movement of the rod 300 in direction A to movement of the sliding lever 302 in the direction of arrow C. In the illustrated example, direction C may be generally parallel to the longitudinal axis of the wand 110 when in the extended configuration, though this is not a limitation of the present disclosure unless specifically claimed as such. Movement of the sliding rod 302 may be constrained by one or more slots and post 320.

A second end region 322 of the sliding lever 302 may include a finger 324 configured to selectively engage (e.g., contact) the plunger 304. The sliding lever 302 may be biased (e.g., by way of one or more springs or the like 301) in the opposite direction of arrow C. The sliding lever 302 may therefore be generally biased to not contact the plunger 304. In at least one example, the sliding lever 302 may be generally biased generally away from the plunger cavity 306. The plunger cavity 306 may be formed in first hinge member 151.

The plunger 304 may be formed in the second hinge member 153, and may be biased (e.g., by way of one or more springs or the like 303) generally radially outward from the second hinge member 153. Rotation of the second hinge member 153 relative to first hinge member 151 about the pivot axis of the joint 141 causes the plunger 304 to also rotate about the pivot axis of the joint 141. The distal end of the plunger 304 may slide in a groove or slot formed in the first hinge member 151. When the distal end of the plunger 304 is aligned with the plunger cavity 306, plunger spring 303 will urge the distal end of the plunger 304 into the plunger cavity 306, thereby locking (e.g., fixing) the first and second hinge members 151, 153 in the storage configuration as generally illustrated in FIG. 10. The position of the plunger 304 in the second hinge member 153 and the position of the plunger cavity 306 in the first hinge member 151 may be arranged such that they align with each other in the storage configuration.

To release (e.g., unlock) the second locking mechanism 202, the user may press (e.g., urge) the button 216 inwardly against the biasing device which causes the rod 300 to move in the direction of arrow A, thereby causing the sliding lever 302 to move in the direction of arrow C such that the finger contacts the distal end of the plunger 304 and urging the plunger 304 out of the plunger cavity 306 (e.g., generally in the direction of arrow D in FIG. 10). Once the plunger 304 has been urged out of the plunger cavity 306, the first and second hinge members 151, 153 are unlocked and can be moved relative to each other.

It should be appreciated that the first hinge member 151 may include additional plunger cavities corresponding to alternative configurations/positions. For example, one alternative configurations/positions may correspond to a position a configurations/positions between the extended configuration and the storage configuration. Alternatively (or in addition), the alternative configurations/positions may correspond to the extended alternative configuration.

Figure 11:
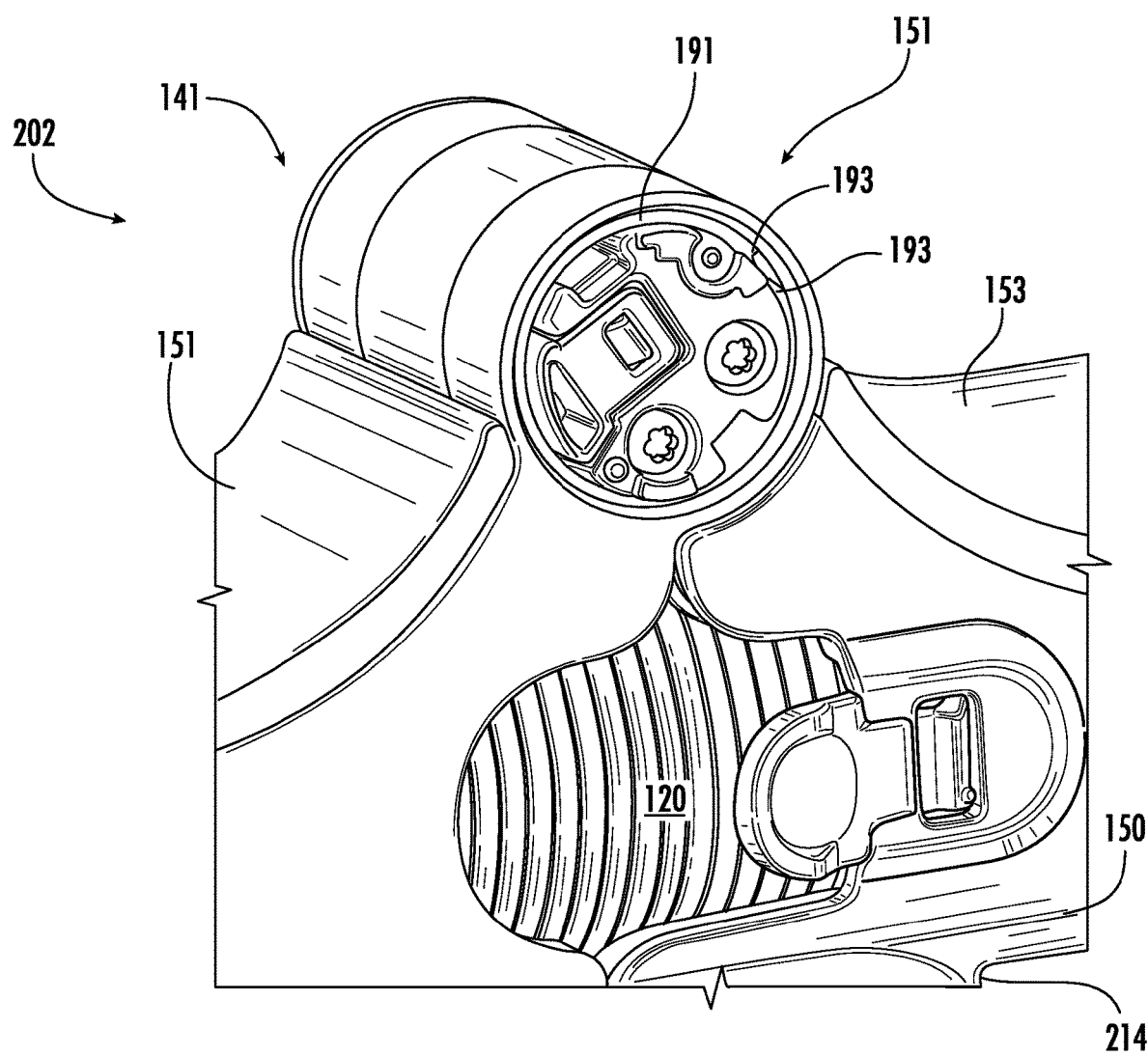
FIG. 11 generally illustrates a perspective cross-sectional view of an example of the joint including a supporting ring.
Figure 12:
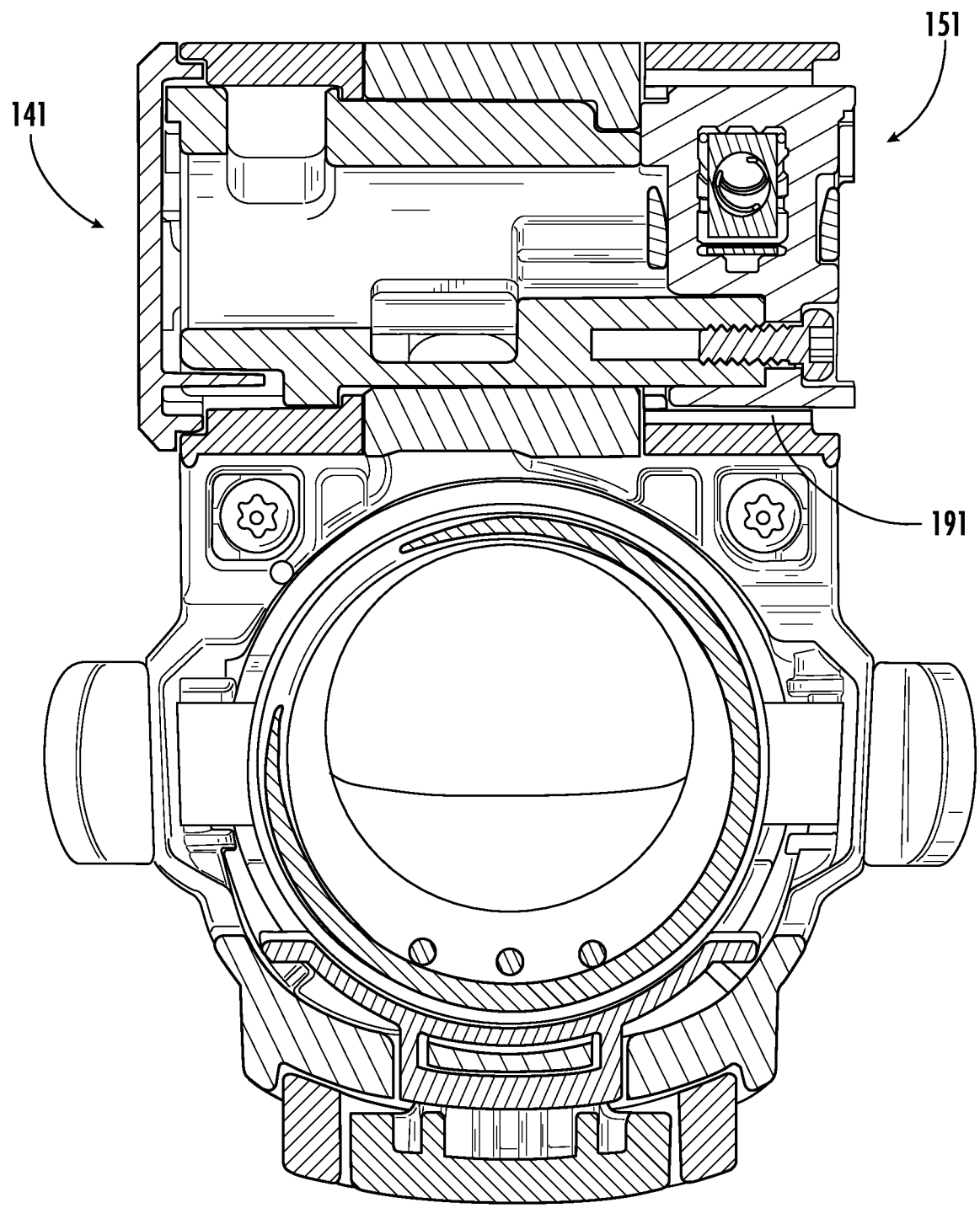
FIG. 12 generally illustrates an end cross-sectional view of the joint of FIG. 11.

Turning now to FIGS. 11 and 12, the joint 141 may optionally include one or more supporting rings 191. The supporting ring 191 may be integrated into the joint 141, for example, around the hinge 155. The supporting ring 191 may increase the strength of the joint 141. In at least one example, the supporting ring 191 may increase the torsional rigidity of the joint 141 and/or prevent separation of the hinge members 151, 153 relative to each other. The supporting ring 191 may include a steel ring integrated around the storage locking mechanism. In some examples, the supporting ring 191 may extend at least partially around the hinge 151. As shown, the supporting ring 191 may include a locking ring and/or c-shaped configuration in which the supporting ring 191 has two ends 193 that are configured to be disposed proximate to each other, but a spaced distanced apart. The two ends 193 may be configured such the supporting ring 191 does not overlap with itself (as shown) or such that the supporting ring 191 overlaps itself. The supporting ring 191 may also include an annular ring which does not have any ends.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. It will be appreciated by a person skilled in the art that a surface cleaning apparatus and/or agitator may embody any one or more of the features contained herein and that the features may be used in any particular combination or sub-combination. Modifications and substitutions by one of ordinary skill in the art are considered to be within the scope of the present invention, which is not to be limited except by the claims.

What is claimed is:

1. A wand comprising:
   a first and a second wand segment defining a first and a second portion of an air passage;
   a bendable wand joint comprising a first and a second hinge member and a hinge configured to pivotally connect said first and said second wand segments together in multiple configurations, said multiple configurations comprising:

an extended configuration in which said first and said second rigid wand segments are straight relative to each other during use; and a storage configuration in which said first and said second rigid wand segments are bent relative to each other during use;

a flexible tube between said first and said second rigid wand segments defining a flexible air portion of said air passage and configured to flex when said first and said second hinge members pivot about said hinge; and a first locking mechanism comprising a locking arm including a hook or pawl pivotally coupled to said first hinge member, said hook or pawl configured to be at least partially received in a locking cavity formed in said second hinge member when said wand is disposed in said extended configuration to lock the first and second wand segments in said extended configuration;

a second locking mechanism configured to lock the first and second wand segments in said storage configuration, said second locking mechanism comprising a rod, a sliding lever, a plunger, and a plunger cavity, wherein said plunger is configured to be at least partially received in said plunger cavity when said wand is disposed in said storage configuration; and a single actuator for unlocking the first and second rigid wand segments in both the extended configuration and the storage configuration;

wherein when said wand is disposed in said extended configuration, depressing the single actuator causes said locking arm to pivot and said hook or pawl to be removed from said locking cavity to unlock said wand; and wherein when said wand is disposed in said storage configuration, depressing the single actuator causes said rod to move in a first direction, which in turn causes said sliding rod to move a second direction and urge said plunger out of said plunger cavity.

2. The wand of claim 1, wherein said single actuator is disposed on an opposite side of said wand than said hinge.

3. The wand of claim 1, wherein said single actuator includes a release button.

4. The wand of claim 3, wherein said release button is disposed on an opposite side of said wand than said hinge.

5. The wand of claim 1, wherein the first and the second wand segment are configured to be folded about 180° in a forward direction when transitioning from the extended configuration to the storage configuration.

6. The wand of claim 1, wherein the single actuator includes a locking collar pivotally coupled to the second hinge member.

7. The wand of claim 6, wherein the locking collar includes a release button.

8. The wand of claim 7, wherein the locking collar includes a biasing device configured to urge the locking collar to a default locking position.

9. The wand of claim 1, further comprising:

a locking arm guard extending from the first hinge member and around a distal end of the locking arm; and a locking arm sidewall extending outward from the second hinge member and at least partially around the locking cavity, wherein the locking arm sidewall is configured to receive at least a portion of the locking arm guard.

10. A wand comprising:

a first and a second wand segment defining a first and a second portion of an air passage;

a bendable wand joint comprising a first hinge member, a second hinge member, and a hinge configured to pivotally connect said first and said second wand segments together in at least a first configuration and a second configuration, said first configuration corresponding to an extended position;

a flexible tube coupled between said first and said second rigid wand segments; and a first locking mechanism to lock the first and second wand segments in said first configuration;

a second locking mechanism configured to lock the first and second wand segments in said second configuration, said second locking mechanism comprising a rod, a sliding lever, a plunger, and a plunger cavity, wherein said plunger is configured to be at least partially received in said plunger cavity when said wand is disposed in said second configuration; and a single actuator for unlocking the first and second rigid wand segments in both the first configuration and the second configuration;

wherein when said wand is disposed in said second configuration, depressing the single actuator causes said rod to move in a first direction, which in turn causes said sliding rod to move a second direction and urge said plunger out of said plunger cavity.

11. The wand of claim 10, wherein said second configuration is a storage position.

12. The wand of claim 10, wherein said second configuration is an intermediate position.

13. The wand of claim 10, wherein said single actuator is disposed on an opposite side of said wand than said hinge.

14. The wand of claim 13, wherein said single actuator includes a release button.

15. The wand of claim 11, wherein the first and the second wand segment are configured to be folded about 180° in a forward direction when transitioning from the first configuration to the second configuration.

16. A wand comprising:

a first wand segment including a first hinge member and a second wand segment including a second hinge member;

a hinge configured to pivotally connect said first and said second wand segments together in at least a first configuration and a second configuration, said first configuration corresponding to an extended position;

a flexible tube coupled between said first and said second rigid wand segments; and a first lock configured to lock the first and second wand segments in said first configuration;

a second lock configured to lock the first and second wand segments in said second configuration, said second locking mechanism comprising a rod, a sliding lever, a plunger, and a plunger cavity, wherein said plunger is configured to be at least partially received in said plunger cavity when said wand is disposed in said second configuration; and one actuator configured to unlock both the first and second locks;

wherein when said wand is disposed in said second configuration, depressing the one actuator causes said rod to move, which in turn causes said sliding rod to move and urge said plunger out of said plunger cavity.

17. The wand of claim 16, wherein said second configuration is a storage position.

18. The wand of claim 16, wherein said second configuration is an intermediate position.

19. The wand of claim 16, wherein said hinge further configured to pivotally connect said first and said second wand segments together in a third configuration, said second configuration including a storage position and said third configuration including an intermediate position.

20. The wand of claim 19, wherein the first and the second wand segment are configured to be folded about 180° in a forward direction when transitioning from the first configuration to the second configuration.

\* \* \* \* \*